United States Patent
Wei et al.

(10) Patent No.: US 12,032,849 B2
(45) Date of Patent: Jul. 9, 2024

(54) DISTRIBUTED STORAGE SYSTEM AND COMPUTER PROGRAM PRODUCT

(71) Applicant: Huawei Cloud Computing Technologies Co., Ltd., Guizhou (CN)

(72) Inventors: Mingchang Wei, Shenzhen (CN); Rong Rao, Shenzhen (CN); Chi Song, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 317 days.

(21) Appl. No.: 17/352,951

(22) Filed: Jun. 21, 2021

(65) Prior Publication Data

US 2021/0311654 A1 Oct. 7, 2021

Related U.S. Application Data

(63) Continuation of application No. PCT/CN2018/122935, filed on Dec. 22, 2018.

(51) Int. Cl.
*G06F 3/06* (2006.01)

(52) U.S. Cl.
CPC .......... *G06F 3/0652* (2013.01); *G06F 3/0604* (2013.01); *G06F 3/0653* (2013.01); *G06F 3/0659* (2013.01); *G06F 3/067* (2013.01); *G06F 3/0689* (2013.01)

(58) Field of Classification Search
CPC .... G06F 3/0652; G06F 3/0604; G06F 3/0653; G06F 3/0659; G06F 3/067
See application file for complete search history.

(56) References Cited

U.S. PATENT DOCUMENTS

| | | | |
|---|---|---|---|
| 9,471,585 B1* | 10/2016 | Theimer | G06F 3/0641 |
| 2002/0004857 A1* | 1/2002 | Arakawa | G06F 3/0608 |
| | | | 710/1 |
| 2005/0091556 A1 | 4/2005 | Frolund et al. | |

(Continued)

FOREIGN PATENT DOCUMENTS

| | | |
|---|---|---|
| CN | 105095013 A | 11/2015 |
| CN | 105242879 A | 1/2016 |

(Continued)

OTHER PUBLICATIONS

Anderson, Darrell, and Jeff Chase. "Failure-atomic file access in an interposed network storage system." Proceedings the Ninth International Symposium on High-Performance Distributed Computing. IEEE, 2000. (Year: 2000).*

(Continued)

*Primary Examiner* — Nicholas J Simonetti
(74) *Attorney, Agent, or Firm* — Conley Rose, P.C.

(57) ABSTRACT

A distributed storage system comprises a data storage node $N_x$ that receives a write success response returned by a hard disk that provides the storage address. The data storage node $N_x$ returns a write success response to a client. The client receives the write success response returned by the data storage node $N_x$, and the client returns a write completion response to a host.

20 Claims, 5 Drawing Sheets

(56) References Cited

U.S. PATENT DOCUMENTS

| | | | | |
|---|---|---|---|---|
| 2009/0089612 | A1* | 4/2009 | Mathew | G06F 11/1076 711/E12.001 |
| 2011/0107113 | A1* | 5/2011 | Resch | H04L 67/1097 713/193 |
| 2011/0208912 | A1* | 8/2011 | Chambliss | G06F 11/1076 714/E11.088 |
| 2011/0208995 | A1 | 8/2011 | Hafner et al. | |
| 2012/0266044 | A1 | 10/2012 | Hu et al. | |
| 2015/0095573 | A1* | 4/2015 | Kong | G06F 3/0665 711/114 |
| 2015/0324371 | A1* | 11/2015 | Guo | G06F 16/1827 707/693 |
| 2016/0357440 | A1 | 12/2016 | Wang et al. | |
| 2016/0357634 | A1 | 12/2016 | Wang et al. | |
| 2017/0169233 | A1* | 6/2017 | Hsu | G06F 16/215 |
| 2017/0177489 | A1 | 6/2017 | Zhang et al. | |
| 2017/0308332 | A1* | 10/2017 | Yi | G06F 3/06 |
| 2019/0235956 | A1 | 8/2019 | Liu et al. | |

FOREIGN PATENT DOCUMENTS

| | | |
|---|---|---|
| CN | 105612489 A | 5/2016 |
| CN | 108780386 A | 11/2018 |

OTHER PUBLICATIONS

Thomasian, Alexander, and Yujie Tang. "Performance, reliability, and performability aspects of hierarchical RAID." 2011 IEEE Sixth International Conference on Networking, Architecture, and Storage. IEEE, 2011. (Year: 2011).*

Aguilera, Marcos Kawazoe, Ramaprabhu Janakiraman, and Lihao Xu. "Using erasure codes efficiently for storage in a distributed system." 2005 International Conference on Dependable Systems and Networks (DSN'05). IEEE, 2005. (Year: 2005).*

Qu Tianshan, "Erasure Code Overwrite Design and Implementation in Storage System Ceph," Nanjing University, May 2016, with an English abstract, 65 pages.

* cited by examiner

DISTRIBUTED STORAGE SYSTEM AND COMPUTER PROGRAM PRODUCT

CROSS-REFERENCE TO RELATED APPLICATIONS

This is a continuation of International Patent Application No. PCT/CN2018/122935 filed on Dec. 22, 2018, which is hereby incorporated by reference in its entirety.

TECHNICAL FIELD

The present disclosure relates to the field of information technologies, and in particular, to a distributed storage system and a computer program product.

BACKGROUND

A distributed storage system includes a plurality of storage nodes. When a client writes data into the distributed storage system based on a write request sent by a host, the data is stored in a corresponding storage node in a form of a stripe. For example, according to an erasure coding (EC) algorithm, there are N data strips and M check strips in the stripe, and a length of the stripe is N+M, where both N and M are positive integers. The client divides to-be-stored data into data of the N data strips, and generates data of the M check strips according to the EC algorithm. When the client writes the data of the strips in the stripe with the length of N+M into corresponding N+M storage nodes, to ensure atomicity of a write operation, the write operation is performed in two phases: a preparation phase and a commit or abort phase.

In the preparation phase, each of the N+M storage nodes records a write log, persistently saves the write log, and returns a response to the client. The write log on the storage node records a mapping between a host access address of data of a strip that is received by the storage node and a strip identifier. In this case, content in the write log is content that cannot be accessed by the client.

In the commit or abort phase, after each of the N+M storage nodes persistently saves a write log and returns a response to the client, the client sends a commit command to each of the N+M storage nodes. When one of the N+M storage nodes fails to return a response to the client, the client sends an abort instruction to the N+M storage nodes. After completing an operation based on the commit or abort command, each of the N+M storage nodes returns a response to the client.

After the client sends the commit command, the storage node stores the content in the write log in a form of accessible metadata, to be specific, establishes the mapping between the host access address of the data of the strip and the strip identifier. Then, the client sends a write completion response to the host.

In the foregoing operation in other approaches, atomicity of the write operation performed by the client in the distributed storage system can be ensured. However, in the write operation process, the storage node needs to send two responses to the client before the client sends the write completion response to the host. Consequently, a write operation delay is increased, thereby affecting write performance.

SUMMARY

This application provides a distributed storage system and a computer program product, to reduce a write operation delay in the distributed storage system and improve write performance of the distributed storage system.

According to a first aspect, the present disclosure provides a distributed storage system, where the distributed storage system includes a client and M storage nodes $N_j$, j is an integer ranging from 1 to M, the M storage nodes $N_j$ include L data storage nodes $N_x$, x is an integer ranging from 1 to L, both L and M are positive integers, and L is less than M, the client is configured to receive a write request from a host, where the write request includes data of the host and a host access address of the data, generate data of M strips $SU_{Nj}$ for the data according to an EC algorithm, where the M strips $SU_{Nj}$ constitute a stripe, the M strips $SU_{Nj}$ include L data strips $SU_{Nx}$, the L data strips $SU_{Nx}$ are used to store data of the data strip $SU_{Nx}$ that is obtained by dividing the data of the host, and a strip other than the L data strips $SU_{Nx}$ is used to store check data of the data of the L data strips $SU_{Nx}$, and send the data of the strip $SU_{Nj}$ to the storage node $N_j$, the data storage node $N_x$ is configured to receive the data of the data strip $SU_{Nx}$ that is sent by the client, establish a mapping between a host access address of the data of the data strip $SU_{Nx}$ and an identifier of the data strip $SU_{Nx}$, write the data of the data strip $SU_{Nx}$ into a hard disk of the data storage node $N_x$, receive a write success response returned by the hard disk, and send a write success response to the client in response to the write success response, and the client is further configured to return a write completion response to the host in response to the write success response returned by the data storage node $N_x$. Therefore, the data storage node $N_x$ receives the write success response returned by the hard disk that provides the storage address, the data storage node $N_x$ returns the write success response to the client, the client receives the write success response returned by the data storage node $N_x$, and the client returns the write completion response to the host. In this way, a write delay in the distributed storage system is reduced, and write performance is improved.

In an implementation, when writing the data of the data strip $SU_{Nx}$ into the hard disk, the data storage node $N_x$ writes the data of the data strip $SU_{Nx}$ into a logical address of the hard disk. In another implementation, in a solid-state drive (SSD) that supports an open channel, when writing the data of the data strip $SU_{Nx}$ into the hard disk, the data storage node $N_x$ writes the data of the data strip $SU_{Nx}$ into a physical address of the SSD. In another implementation, the hard disk may alternatively be a logical unit (LU) in a storage array, and the LU is also referred to as a LUN.

With reference to the first aspect, in some possible implementations, the data storage node $N_x$ is further configured to set a status of the mapping between the host access address of the data of the data strip $SU_{Nx}$ and the identifier of the data strip $SU_{Nx}$ to a write completion state in response to the write success response returned by the hard disk.

With reference to the first aspect, in some possible implementations, the distributed storage system further includes a stripe server, and the stripe server records a mapping between the stripe and identifiers of the M strips $SU_{Nj}$ and a mapping between the identifier of the strip $SU_{Nj}$ in the stripe and the storage node $N_j$, the client is further configured to receive a first read request sent by the host, where the first read request includes the host access address of the data of the data strip $SU_{Nx}$, and send, to the data storage node $N_x$, a first request for reading the data of the data strip $SU_{Nx}$, the data storage node $N_x$ is further configured to, in response to the first request for reading the data of the data strip $SU_{Nx}$, detect that the status of the mapping between the host access address of the data of the data strip $SU_{Nx}$ and the identifier of the data strip $SU_{Nx}$ is the write completion state, and send a check request to the stripe server, where the check request includes the identifier of the strip $SU_{Nx}$, the stripe server is configured to determine the stripe based on the identifier of the strip $SU_{Nx}$, read the data of the strip $SU_{Nj}$ based on the mapping between the identifier of the strip $SU_{Nj}$ in the stripe and the storage node $N_j$, determine, according to the EC algorithm, whether the data of the strip $SU_{Nj}$ is accurate, and send a notification to the data storage node $N_x$ when the data of the strip $SU_{Nj}$ is accurate, where the notification is used to indicate that the data of the data strip $SU_{Nx}$ is accurate, the data storage node $N_x$ is further configured to return the data of the data strip $SU_{Nx}$ to the client in response to the notification, and the client is further configured to receive the data of the data strip $SU_{Nx}$, and return the data of the data strip $SU_{Nx}$ to the host.

In the present disclosure, before the client sends a commit command, the client may return the write completion response to the host. In this embodiment of the present disclosure, whether the data of the strip $SU_{Nj}$ is accurate is determined by using the EC algorithm, thereby ensuring data consistency.

With reference to the first aspect and the plurality of possible implementations of the first aspect, in some possible implementations, the client is further configured to send a commit command to the data storage node $N_x$ in response to the write success response from the data storage node $N_x$, and the data storage node $N_x$ is further configured to receive the commit command from the client, and set the status of the mapping between the host access address of the data of the data strip $SU_{Nx}$ and the identifier of the data strip $SU_{Nx}$ to a readable state. In response to the write completion response sent by the client to the host, the client sends the commit command to the data storage node $N_x$, the data storage node $N_x$ sets the status of the mapping between the host access address of the data of the data strip $SU_{Nx}$ and the identifier of the data strip $SU_{Nx}$ to the readable state, and the data storage node $N_x$ no longer returns a response to the client, thereby reducing interactions between the client and the storage node.

With reference to the first aspect and the plurality of possible implementations of the first aspect, in some possible implementations, the client is further configured to receive a second read request sent by the host, where the second read request includes the host access address of the data of the data strip $SU_{Nx}$, and send, to the storage node $N_x$, a second request for reading the data of the data strip $SU_{Nx}$, the storage node $N_x$ is further configured to, in response to the second request for reading the data of the data strip $SU_{Nx}$, detect that the status of the mapping between the host access address of the data of the data strip $SU_{Nx}$ and the identifier of the data strip $SU_{Nx}$ is a readable state, and return the data of the data strip $SU_{Nx}$ to the client, and the client is further configured to receive the data of the data strip $SU_{Nx}$ from the data storage node $N_x$, and return, to the host, the data of the data strip $SU_{Nx}$ from the data storage node $N_x$. The client sends a commit command to the data storage node $N_x$, so that the client does not need to perform a check operation according to the EC algorithm when reading the data of the data strip $SU_{Nx}$ from the data storage node $N_x$, further improving read performance of the distributed storage system.

According to a second aspect, the present disclosure provides a computer program product, where the computer program product includes computer instructions, the computer program product is applied to a distributed storage system, the distributed storage system includes the client and the M storage nodes $N_j$ in the first aspect of the present disclosure, j is an integer ranging from 1 to M, the M storage nodes $N_j$ include L data storage nodes $N_x$, x is an integer ranging from 1 to L, and L is less than M, and the client and the data storage node $N_x$ separately execute a subset of related instructions in the computer instructions to implement the implementations of the first aspect of the present disclosure.

According to a third aspect, an embodiment of the present disclosure provides a storage node, where the distributed storage system includes a client and M storage nodes $N_j$, j is an integer ranging from 1 to M, the M storage nodes $N_j$ include L data storage nodes $N_x$, x is an integer ranging from 1 to L, and L is less than M, the data storage node $N_x$ includes a processor and an interface, the processor communicates with the interface, and the processor is configured to implement the implementations of the storage node $N_x$ in the first aspect of the present disclosure.

According to a fourth aspect, an embodiment of the present disclosure provides a storage node, where the distributed storage system includes a client and M storage nodes $N_j$, j is an integer ranging from 1 to M, the M storage nodes $N_j$ include L data storage nodes $N_x$, x is an integer ranging from 1 to L, and L is less than M, and the data storage node $N_x$ includes units configured to implement the implementations of the storage node $N_x$ in the first aspect of the present disclosure.

According to a fifth aspect, an embodiment of the present disclosure provides a client, where the distributed storage system includes the client and M storage nodes $N_j$, j is an integer ranging from 1 to M, the M storage nodes $N_j$ include L data storage nodes $N_x$, x is an integer ranging from 1 to L, and L is less than M, the client includes a processor and an interface, the processor communicates with the interface, and the processor is configured to implement the implementations of the client in the first aspect of the present disclosure.

According to a sixth aspect, an embodiment of the present disclosure provides a client, where the distributed storage system includes the client and M storage nodes $N_j$, j is an integer ranging from 1 to M, the M storage nodes $N_x$ include L data storage nodes $N_x$, x is an integer ranging from 1 to L, and L is less than M, and the client includes units configured to implement the implementations of the client in the first aspect of the present disclosure.

DESCRIPTION OF EMBODIMENTS

Figure 1:
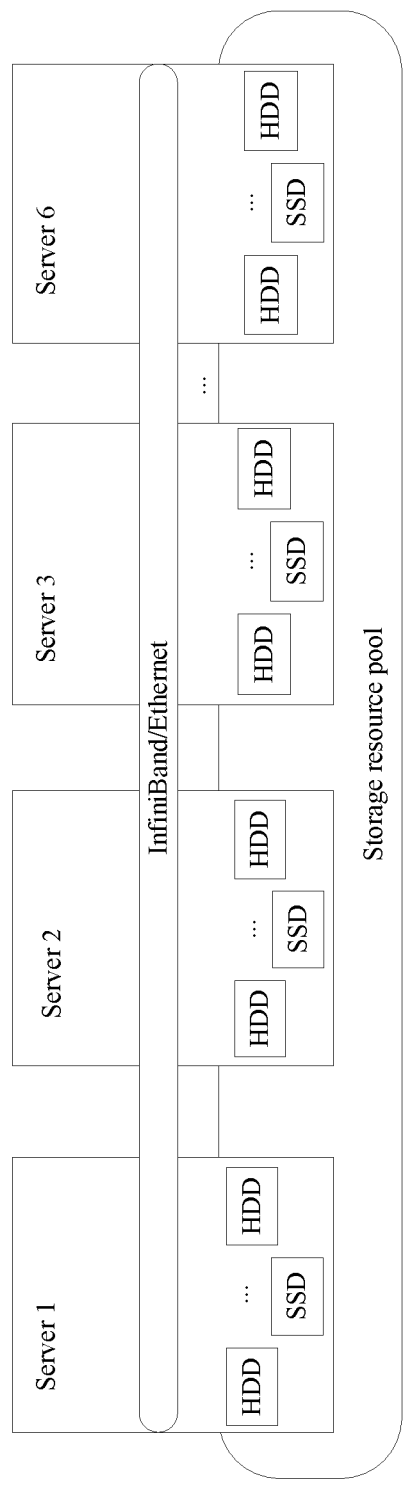
FIG. 1 is a schematic diagram of a distributed storage system according to an embodiment of the present disclosure.

A distributed storage system in an embodiment of the present disclosure includes a Huawei® Fusionstorage® series and an OceanStor® 9000 series. For example, as shown in FIG. 1, the distributed storage system includes a plurality of servers such as a server 1, a server 2, a server 3, a server 4, a server 5, and a server 6. The servers communicate with each other by using InfiniBand, Ethernet, or the like. In this embodiment of the present disclosure, the server in the distributed storage system is also referred to as a storage node. In actual application, a quantity of servers in the distributed storage system may be increased based on an actual requirement. This is not limited in this embodiment of the present disclosure.

Figure 2:
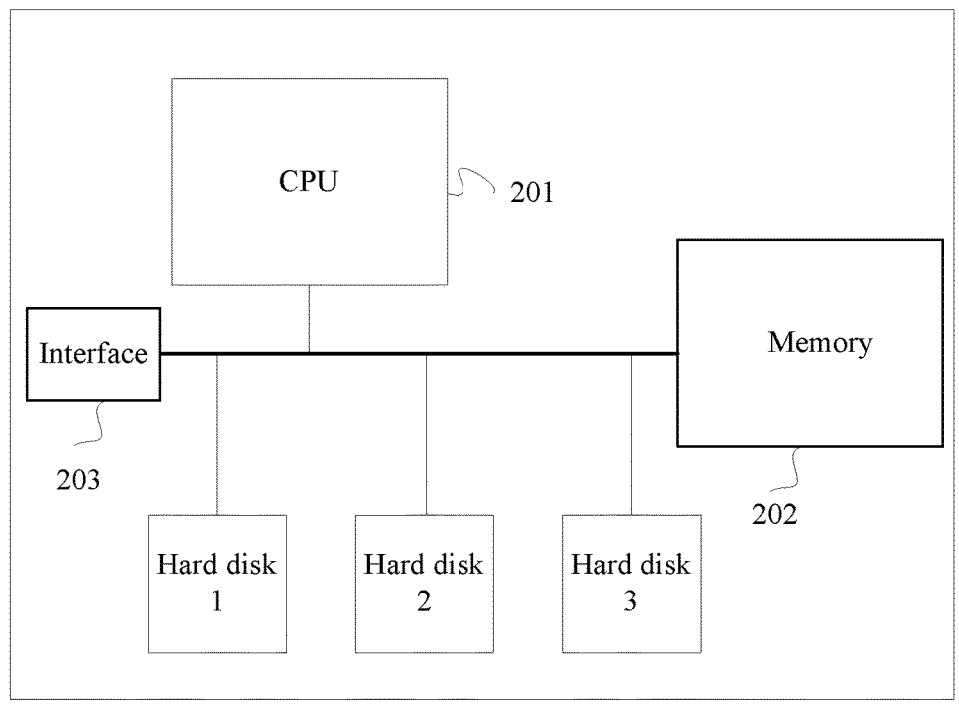
FIG. 2 is a schematic structural diagram of a server in a distributed block storage system according to an embodiment of the present disclosure.

The server in the distributed storage system includes a structure shown in FIG. 2. As shown in FIG. 2, each server in the distributed storage system includes a central processing unit (CPU) 201, a memory 202, an interface 203, a hard disk 1, a hard disk 2, and a hard disk 3. The memory 202 stores a computer instruction. The CPU 201 executes the computer instruction in the memory 202 to perform a corresponding operation. The interface 203 may be a hardware interface such as a network interface card (NIC) or a host bus adapter (HBA), or may be a program interface module or the like. The hard disk includes an SSD, a mechanical hard disk, or a hybrid hard disk. For example, the mechanical hard disk is a hard disk drive (HDD). A hard disk interface may be a Serial Advanced Technology Attachment (SATA) interface, a Serial Attached Small Computer System Interface (SCSI) (SAS) interface, a Fiber Channel (FC) interface, a Peripheral Component Interconnect Express (PCIe) interface, a Non-Volatile Memory Express (NVMe) interface, or the like. The CPU 201 may be replaced by a field-programmable logic gate array (FPGA) or other hardware. Alternatively, an FPGA or other hardware and the CPU 201 jointly perform the foregoing corresponding operation. For ease of description, in this embodiment of the present disclosure, the CPU 201 and the memory 202 are referred to as a processor, or hardware that replaces the CPU 201 and the memory 202 is referred to as a processor, or a combination of the CPU 201, the memory 202, and other hardware is referred to as a processor.

A client in the distributed storage system writes data into the distributed storage system based on a write request from a host or reads data from the distributed storage system based on a read request from a host. The server shown in this embodiment of the present disclosure may serve as the client. In addition, the client may alternatively be a device independent of the server shown in FIG. 2. A specific form of the host in this embodiment of the present disclosure may be a server, a virtual machine (VM), a terminal device, or the like. This is not limited in this embodiment of the present disclosure. The client in the distributed storage system provides a storage resource in the distributed storage system for the host. For example, in a distributed block storage system, a client provides a block resource such as an LU for a host, to provide a data access operation for the host. The LU is also referred to as an LU number (LUN). In a distributed file storage system, a client provides a file resource for a host. In a distributed object storage system, a client provides an object resource for a host.

Figure 3:
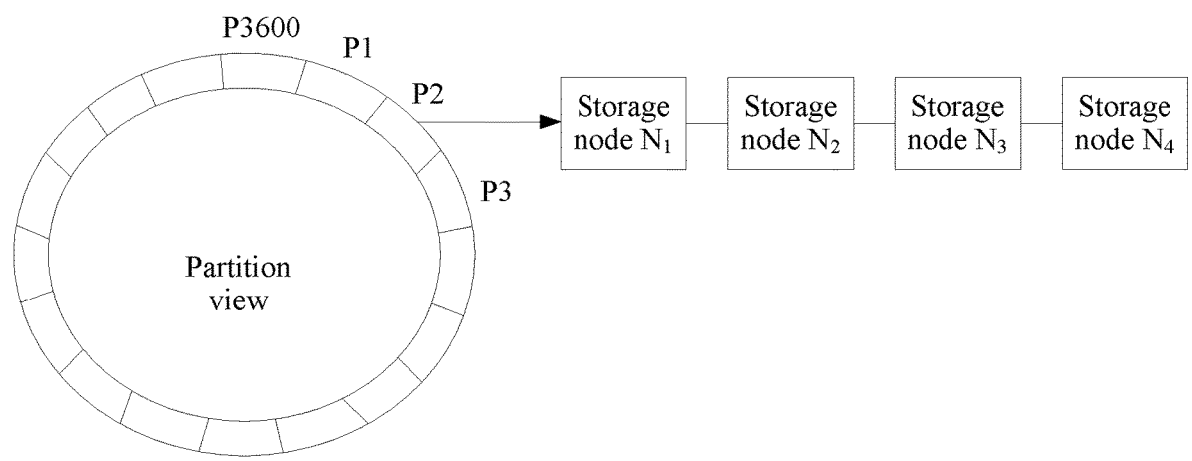
FIG. 3 is a schematic diagram of a partition view of a distributed block storage system according to an embodiment of the present disclosure.

In an embodiment of the present disclosure, a distributed block storage system is used as an example. A client provides a block protocol access interface, so that the client provides a distributed block storage access point service. A host may access a storage resource in a storage resource pool in the distributed block storage system by using the client. The block protocol access interface is usually configured to provide a LUN for the host. A distributed block storage system program is run on a server including a hard disk, so that the server serves as a storage node to store client data. For example, for the server, one hard disk may serve as one storage node by default, in other words, when the server includes a plurality of hard disks, the plurality of hard disks may serve as a plurality of storage nodes. In another implementation, the distributed block storage system program is run on the server, so that the server serves as one storage node. This is not limited in this embodiment of the present disclosure. Therefore, for a structure of the storage node, refer to FIG. 3 and related descriptions. During initialization of the distributed block storage system, hash space (for example, 0 to $2^{32}$) is divided into N equal parts. Each equal part is one partition, and the N equal parts are equally allocated based on a quantity of hard disks. For example, in the distributed block storage system, N is 3600 by default, in other words, the partitions are P1, P2, P3, ..., and P3600. Assuming that the current distributed block storage system includes 18 hard disks (storage nodes), each storage node carries 200 partitions. The partition P includes M storage nodes $N_j$. A correspondence between the partition and the storage node, namely, a mapping between the partition and the storage node $N_j$ included in the partition, is also referred to as a partition view. As shown in FIG. 3, in an example, the partition includes four storage nodes $N_j$. In this case, the partition view is "P2-storage node $N_1$-storage node $N_2$-storage node $N_3$-storage node $N_4$", where j is an integer ranging from 1 to M. The partition view is determined during initialization of the distributed block storage system, and is subsequently adjusted along with a change of the quantity of hard disks in the distributed block storage system. The client saves the partition view.

Based on a reliability requirement of the distributed block storage system, data reliability may be improved by using an EC algorithm. For example, a 3+1 mode is used, to be specific, three data strips and one check strip constitute a stripe. In this embodiment of the present disclosure, data is stored in the partition in a form of a stripe. One partition includes R stripes $S_i$, where i is an integer ranging from 1 to R. In this embodiment of the present disclosure, P2 is used as an example for description.

Figure 4:
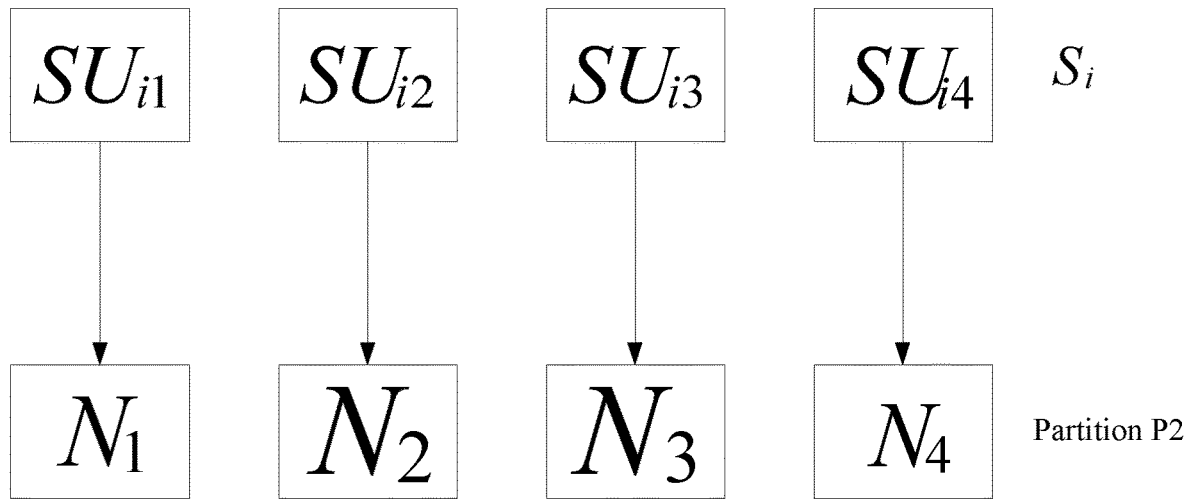
FIG. 4 is a schematic diagram of a relationship between strips and storage nodes in a distributed block storage system according to an embodiment of the present disclosure.

In the distributed block storage system, fragment management is performed on the hard disk in a unit of 8 kilobytes (KB), and allocation information of each 8 KB fragment is recorded in a metadata management area of the hard disk. The fragments of the hard disk constitute the storage resource pool. The distributed block storage system includes a stripe server. A specific implementation may be that a stripe management program runs on one or more servers in the distributed block storage system. The stripe server allocates a stripe to the partition. The partition view shown in FIG. 4 is still used as an example. As shown in FIG. 4, the stripe server allocates, based on the partition view, a storage address, namely, storage space, to a strip $SU_{ij}$ in a stripe $S_i$ in the partition P2 from a storage node $N_j$ corresponding to the partition. Further, the stripe server allocates a storage address to $SU_{i1}$ from the storage node $N_1$, allocates a storage address to $SU_{i2}$ from the storage node $N_2$, allocates a storage address to $SU_{i3}$ from the storage node $N_3$, and allocates a storage address to $SU_{i4}$ from the storage node $N_4$. In another implementation, the stripe server does not allocate a storage address to a strip $SU_{ij}$ in a stripe $S_i$ in the partition P2 from a storage node $N_j$ corresponding to the partition. To be specific, when the client writes data into the storage node, the storage node $N_j$ allocates a storage address to the strip $SU_{ij}$ in the stripe. The storage address allocated to the strip $SU_{ij}$ may be a logical address, for example, a logical block address (LBA), of a hard disk in the storage node $N_j$. In another implementation, in an SSD that supports an open channel, the storage address allocated by the stripe server to the strip $SU_{ij}$ in the stripe from the storage node $N_j$ may be a physical address of the SSD. In another implementation, the hard disk in the storage node $N_j$ is a LUN, namely, a LUN mounted to the storage node. Stripe metadata records a mapping relationship between a stripe identifier and a strip identifier, namely, a correspondence between $S_i$ and a strip $SU_{ij}$ in the stripe. A strip $SU_{ij}$ included in a stripe $S_i$ may be found based on the correspondence. Further, the stripe server further records a correspondence between a strip $SU_{ij}$ and a stripe $S_i$. A stripe $S_i$ may be found by using a strip $SU_{ij}$ based on the correspondence, so that stripe information, for example, all strips $SU_{ij}$ included in $S_i$, is queried.

To reduce a quantity of strip identifiers managed by the stripe server, the stripe server allocates a version number to an identifier of a strip in a stripe. After a stripe is released, a version number of a strip identifier of a strip in the released stripe is updated, so that the strip identifier is used as a strip identifier of a strip in a new stripe. The stripe server pre-allocates a strip $SU_{ij}$ to a stripe $S_i$, so that waiting time can be reduced when the client writes data, thereby improving write performance of the distributed block storage system. In this embodiment of the present disclosure, the strip $SU_{ij}$ in the stripe $S_i$ has a unique identifier in the distributed block storage system.

In this embodiment of the present disclosure, the strip $SU_{ij}$ in the stripe $S_i$ is merely a segment of storage space before the client writes data. When receiving data of the host, the client generates data of M strips $SU_{Nj}$ for the data according to the EC algorithm. The M strips $SU_{Nj}$ include L data strips $SU_{Nx}$ and (M-L) check strips, where both L and M are positive integers, and L is less than M. The check strip has a same length as the data strip. The client divides the data of the host into data of the L data strips, and generates data of the (M-L) check strips for the data of the L data strips according to the EC algorithm. In this embodiment of the present disclosure, a storage node that stores data of the data strip is referred to as a data storage node, and a storage node that stores data of the check strip is referred to as a check storage node.

In this embodiment of the present disclosure, the client provides, for the host, an LU allocated by the distributed block storage system, and a LUN provided by the client is mounted to the host, to provide a data access operation for the host. A host access address is an LBA of the LUN.

Figure 5:
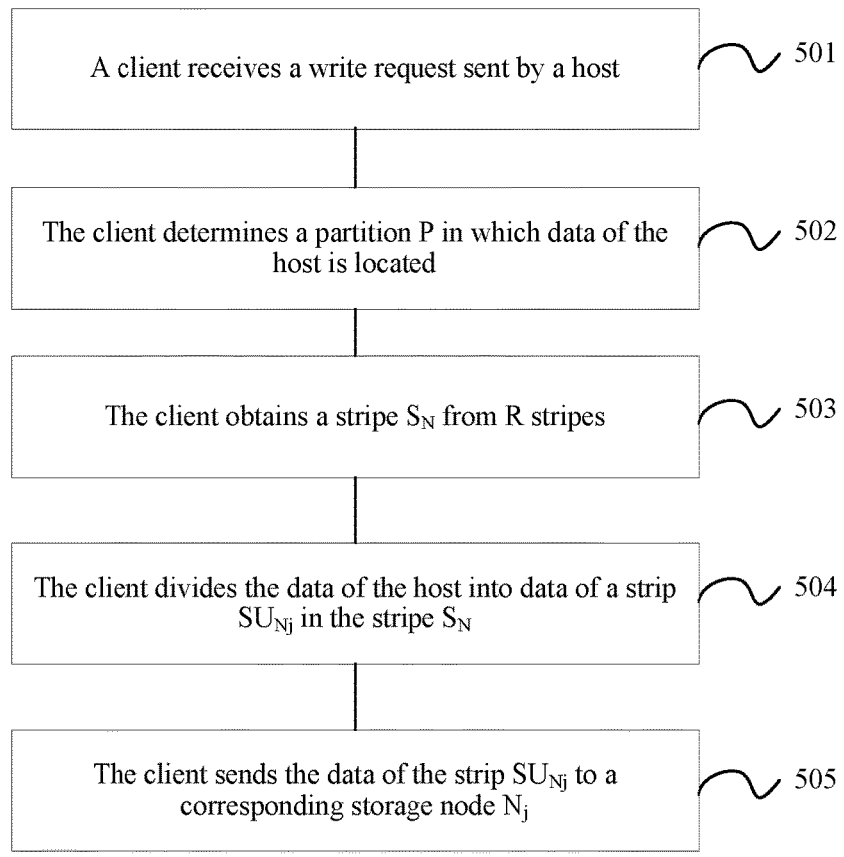
FIG. 5 is a flowchart of a method for writing data by a client in a distributed block storage system according to an embodiment of the present disclosure.

In an embodiment of the present disclosure, as shown in FIG. 5, a client performs the following steps.

Step 501: The client receives a write request sent by a host.

The client receives the write request sent by the host. The write request includes data of the host and a host access address of to-be-stored data. In this embodiment of the present disclosure, the host access address is an LBA of a LUN, and the data of the host is the to-be-stored data.

Step 502: The client determines a partition P in which the data of the host is located.

Figure 6:
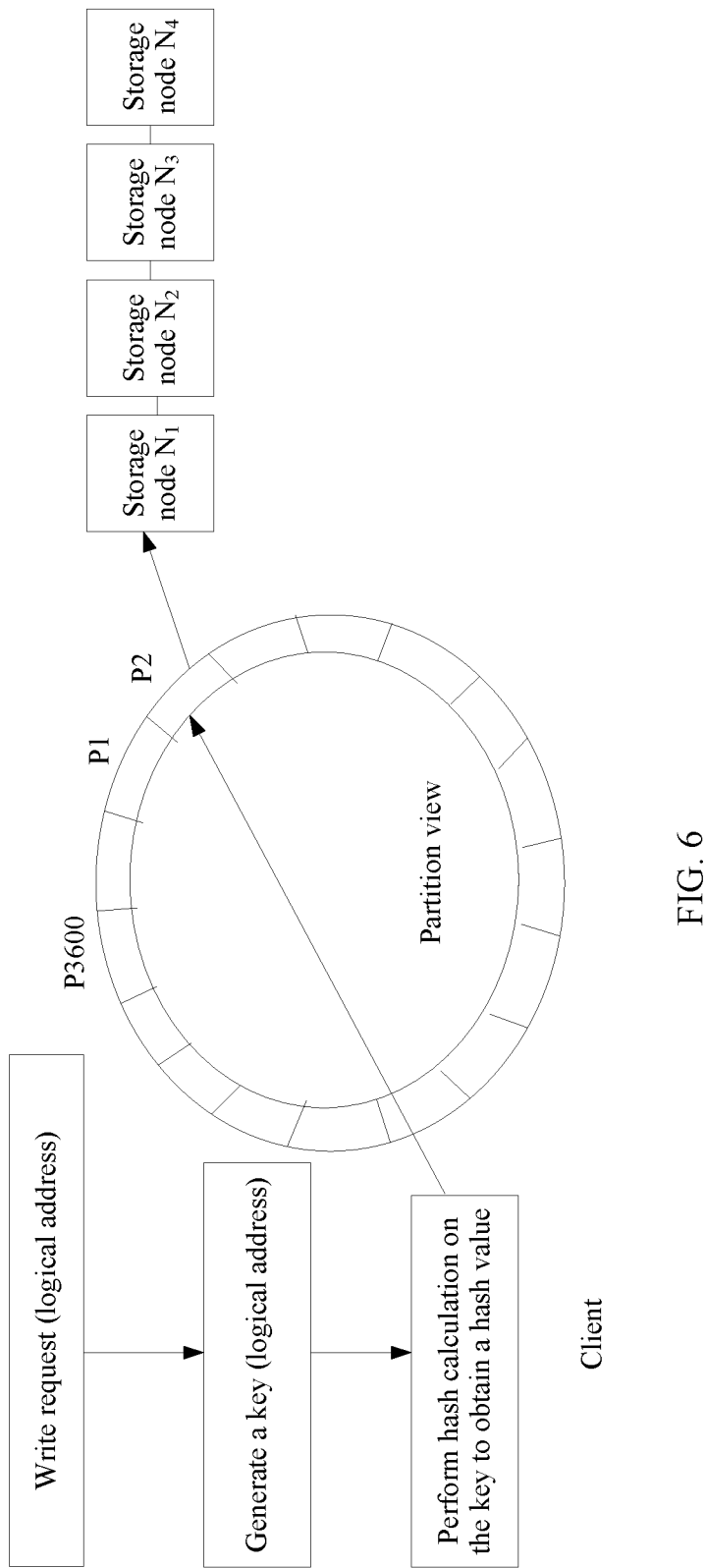
FIG. 6 is a schematic diagram of determining a partition by a client in a distributed block storage system according to an embodiment of the present disclosure.

In this embodiment of the present disclosure, a partition P2 is used as an example. With reference to FIG. 3, the client stores a partition view of a distributed block storage system. As shown in FIG. 6, the partition in which the to-be-stored data is located is determined based on the partition view. In an implementation, the client generates a key based on an LBA of a LUN of the to-be-stored data, calculates a hash value of the key according to a hash algorithm, determines a partition corresponding to the hash value, and therefore determines that the LBA of the LUN is distributed in the partition P2. In other words, the to-be-stored data is distributed in the partition P2.

Step 503: The client obtains a stripe $S_N$ from R stripes, where N is an integer ranging from 1 to R.

A stripe server manages a correspondence between a partition and a stripe, and the stripe server records a mapping between a stripe and a strip in the stripe and a mapping between a strip in a stripe and a storage node. An implementation in which the client obtains the stripe $S_N$ from the R stripes is as follows. The client determines that the LBA of the LUN is distributed in the partition P2, and the client queries the stripe server to obtain a stripe $S_N$ in R stripes included in the partition P2. The LBA of the LUN is an address for writing data by the client in the distributed block storage system. Therefore, that the LBA of the LUN is distributed in the partition P has a same meaning as that the to-be-stored data is distributed in the partition P. Another implementation in which the client obtains the stripe $S_N$ from the R stripes may be as follows. The client obtains the stripe $S_N$ from a stripe in the R stripes that has been allocated to the client.

Step 504: The client divides the data of the host into data of a strip SU; in the stripe $S_N$.

The stripe $S_N$ includes a strip. The client divides the data of the host based on a size of the strip in the stripe. For example, the client divides the data of the host based on a length of the strip in the stripe to obtain data of a strip size, performs a modulo operation on a quantity M (for example, 4) of storage nodes in the partition based on an LBA of a LUN of the data of the strip size, to determine a location of the data of the strip size in the stripe, namely, a corresponding strip $SU_{Nj}$, and further determines, based on the partition view, a storage node $N_j$ corresponding to the strip SUN. Therefore, data of strips in a same LBA of a same LUN is distributed in a same storage node. For example, the data of the host is divided into data of one or more strips SUN. In this embodiment of the present disclosure, P2 is used as an example. With reference to FIG. 4, the stripe $S_N$ includes four strips: $SU_{N1}$, $SU_{N2}$, $SU_{N3}$, and $SU_{N4}$. In an example, the data of the host is divided into data of three data strips, namely, data of the data strip $SU_{N1}$, data of the data strip $SU_{N2}$, and data of the data strip $SU_{N3}$. Further, data of the check strip $SU_{N4}$ is generated based on the data of $SU_{N1}$, the data of $SU_{N2}$, and the data of $SU_{N3}$. The data of the check strip $SU_{N4}$ is also referred to as check data. For how to generate data of a check strip based on data of a data strip in a stripe, refer to an existing EC algorithm for implementing a stripe. Details are not described in this embodiment of the present disclosure. In this embodiment of the present disclosure, both the data of the data strip and the data of the check strip are referred to as the data of the strip $SU_{Nj}$.

Step 505: The client sends the data of the strip $SU_{Nj}$ to the corresponding storage node $N_j$.

In this embodiment of the present disclosure, the client sends the data of the data strip $SU_{N1}$ to a storage node $N_1$, sends the data of the data strip $SU_{N2}$ to a storage node $N_2$, sends the data of the data strip $SU_{N3}$ to a storage node $N_3$, and sends the check data of the check strip $SU_{N4}$ to a storage node $N_4$. The data of the data strip $SU_{Nj}$ further includes metadata, for example, an identifier of the data strip $SU_{Nj}$ and a host access address of the data of the data strip SUN. In the distributed block storage system in this embodiment of the present disclosure, the host access address of the data of the data strip $SU_{Nj}$ is a logical address of a LUN of the data of the data strip SUN. The LUN herein is a LUN mounted to the host.

Figure 7:
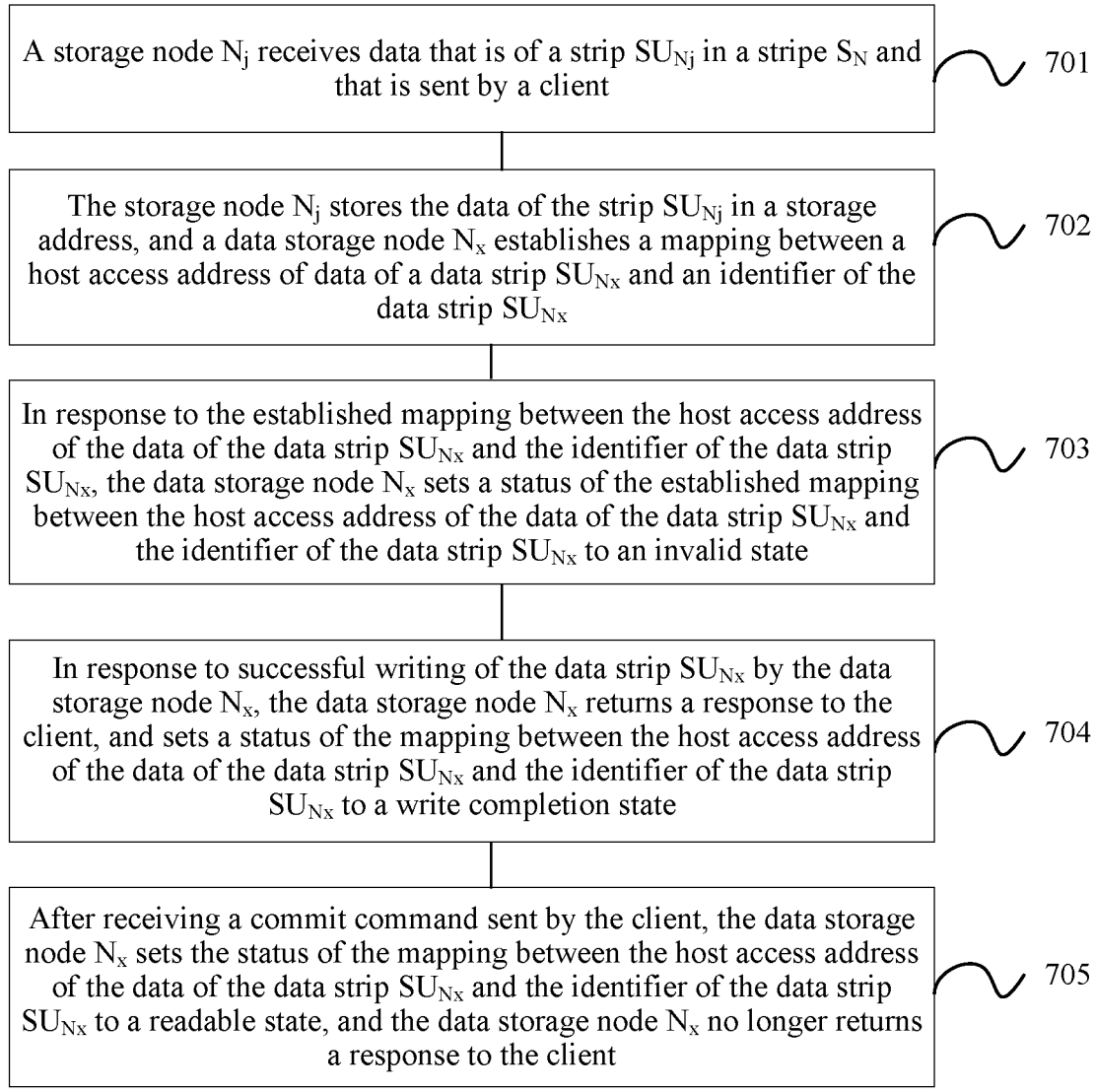
FIG. 7 is a flowchart of a method for writing data of a strip by a storage node according to an embodiment of the present disclosure.

Corresponding to the client embodiment shown in FIG. 5, as shown in FIG. 7, a storage node $N_j$ performs the following steps.

Step 701: The storage node $N_j$ receives data that is of a strip $SU_{Nj}$ in a stripe $S_N$ and that is sent by a client.

With reference to the embodiment shown in FIG. 5, a data storage node $N_1$ receives data of a data strip $SU_{N1}$ that is sent by the client, a data storage node $N_2$ receives data of a data strip $SU_{N2}$ that is sent by the client, a data storage node $N_3$ receives data of a data strip $SU_{N3}$ that is sent by the client, and a storage node $N_4$ receives check data of a check strip $SU_{N4}$ that is sent by the client.

Step 702: The storage node $N_j$ stores the data of the strip $SU_{Nj}$ in a storage address, and a data storage node $N_x$ establishes a mapping between a host access address of data of a data strip $SU_{Nx}$ and an identifier of the data strip $SU_{Nx}$, where a value of x is an integer ranging from 1 to L, L is an integer, L is less than M, L is a quantity of data strips in the stripe $S_N$, and M is a quantity of strips in the stripe $S_N$. In this embodiment of the present disclosure, the host access address of the data of the data strip $SU_{Nx}$ is an LBA of a LUN mounted to a host.

That the storage node $N_j$ stores the data of the strip $SU_{Nj}$ in a storage address includes that the storage node $N_j$ stores the data of the strip $SU_{Nj}$ in a storage address of a hard disk of the storage node $N_j$. In an implementation, the storage address of the hard disk is a logical address of the hard disk. In another implementation, in an SSD that supports an open channel, the storage address is a physical address of the SSD. In another implementation, the hard disk may be a LUN in a storage array.

Further, a storage address allocated by the data storage node $N_1$ to the data of the data strip $SU_{N1}$ is Ad1, a storage address allocated by the data storage node $N_2$ to the data of the data strip $SU_{N2}$ is Ad2, a storage address allocated by the data storage node $N_3$ to the data of the data strip $SU_{N3}$ is Ad3, and a storage address allocated by the data storage node $N_4$ to the check data of the check strip $SU_{N4}$ is Ad4.

Step 703: In response to the established mapping between the host access address of the data of the data strip $SU_{Nx}$ and the identifier of the data strip $SU_{Nx}$, the data storage node $N_x$ sets a status of the established mapping between the host access address of the data of the data strip $SU_{Nx}$ and the identifier of the data strip $SU_{Nx}$ to an invalid state.

The invalid state indicates that data stored in the storage address of the data storage node $N_x$ is in an invalid state, to be specific, the data storage node $N_x$ has not received a write success response returned by a hard disk that provides the storage address. Therefore, the data storage node $N_x$ cannot access the data stored in the storage address, and the client cannot return a write completion response to the host. When the client receives a read request sent by the host, the data storage node $N_x$ receives, from the client, a request for reading the data of the data strip $SU_{Nx}$, and the data storage node $N_x$ detects the status of the mapping between the host access address of the data of the data strip $SU_{Nx}$ and the identifier of the data strip $SU_{Nx}$, where the status of the mapping between the host access address of the data of the data strip $SU_{Nx}$ and the identifier of the data strip $SU_{Nx}$ is the invalid state. In this case, no read operation is performed on the data of the data strip $SU_{Nx}$.

Step 704: In response to successful writing of the data strip $SU_{Nx}$ by the data storage node $N_x$, the data storage node $N_x$ returns a write success response to the client, and sets a status of the mapping between the host access address of the data of the data strip $SU_{Nx}$ and the identifier of the data strip $SU_{Nx}$ to a write completion state.

The data storage node $N_x$ receives a write success response returned by a hard disk, the data storage node $N_x$ returns a write success response to the client, the client receives the write success response returned by the data storage node $N_x$, and the client returns a write completion response to the host. In this way, a write delay in the distributed storage system is reduced, and write performance is improved. Further, in response to successful writing of the data strip $SU_{Nx}$ by the data storage node $N_x$, the data storage node $N_x$ establishes a mapping between the identifier of the data strip $SU_{Nx}$ and the storage address for storing the data of the data strip $SU_{Nx}$. As described above, the storage address may be allocated by a stripe server to the data strip $SU_{Nx}$, or may be allocated by the data storage node $N_x$ to the data strip $SU_{Nx}$. In this embodiment of the present disclosure, a check storage node also establishes a mapping between an identifier of a corresponding check strip and a storage address for storing check data of the check strip.

The host initiates a read operation, and the client reads the data of the data strip $SU_{Nx}$ from the data storage node $N_x$ based on the read request from the host. The read request from the host includes an LBA of a LUN that stores to-be-read data. The LUN herein is a LUN mounted to the host. The data storage node $N_x$ detects the status of the mapping between the host access address of the data of the data strip $SU_{Nx}$ and the identifier of the data strip $SU_{Nx}$, where the status of the mapping between the host access address of the data of the data strip $SU_{Nx}$ and the identifier of the data strip $SU_{Nx}$ is the write completion state. The data storage node $N_x$ sends a check request to the stripe server, where the check request includes the identifier of the strip $SU_{Nx}$. The stripe server records a mapping between the stripe $S_N$ and the strip $SU_{Nx}$ and a mapping between the strip $SU_{Nj}$ in the stripe $S_N$ and the storage node $N_j$, so that the stripe server determines, based on the mapping between the stripe $S_N$ and the strip $SU_{Nx}$, that the strip $SU_{Nx}$ belongs to the stripe $S_N$, reads the data of the strip $SU_{Nj}$ based on the mapping between the strip $SU_{Nj}$ included in the stripe $S_N$ and the storage node $N_j$, and determines, according to an EC algorithm, whether the data of the data strip $SU_{Nx}$ is accurate. If the data of the data strip $SU_{Nx}$ is accurate, the stripe server sends a notification to the data storage node $N_x$ where the notification is used to indicate, to the data storage node $N_x$ that the data of the data strip $SU_{Nx}$ is accurate, and the data storage node $N_x$ returns the data of the data strip $SU_{Nx}$ to the client. In another implementation of this embodiment of the present disclosure, the storage node $N_x$ detects that the status of the mapping between the host access address of the data of the data strip $SU_{Nx}$ and the identifier of the data strip $SU_{Nx}$ is the write completion state, and the storage node $N_x$ sends a check request to the client, where the check request includes the identifier of the strip $SU_{Nx}$. The client queries a mapping between the stripe $S_N$ and the strip $SU_{Nx}$ and a mapping between the strip $SU_{Nj}$ in the stripe $S_N$ and the storage node $N_j$ that are recorded by the stripe server, and determines, according to an EC algorithm, whether the data of the data strip $SU_{Nx}$ is accurate. Further, to reduce a quantity of times the data storage node $N_x$ interacts with the client, the check request sent by the data storage node $N_x$ to the client may further include the data of the data strip $SU_{Nx}$. In this embodiment of the present disclosure, determining, according to the EC algorithm, whether the data of the data strip $SU_{Nx}$ is accurate includes generating, according to the same EC algorithm, data of a check strip for the data of the data strip $SU_{Nx}$, and comparing the generated data of the check strip with data of a check strip that is read from the check storage node, to determine whether the generated data is the same as the read data. If the generated data is the same as the read data, it is considered that the data of the data strip $SU_{Nx}$ is accurate. Therefore, in this embodiment of the present disclosure, before the client sends a commit command, the client may return the write completion response to the host, so that the host can perform a data read operation. In this embodiment of the present disclosure, before the client sends the commit command, the client may return the write completion response to the host. In this embodiment of the present disclosure, whether the data of the strip $SU_{Nj}$ is accurate is determined by using the EC algorithm, thereby ensuring data consistency. In another embodiment of the present disclosure, the host may read data of only one data strip.

Step 705: After receiving the commit command sent by the client, the data storage node $N_x$ sets the status of the mapping between the host access address of the data of the data strip $SU_{Nx}$ and the identifier of the data strip $SU_{Nx}$ to a readable state, and the data storage node $N_x$ no longer returns a response to the client.

When receiving, from the client, a request for reading the data of the data strip $SU_{Nx}$, the data storage node $N_x$ detects the status of the mapping between the host access address of the data of the data strip $SU_{Nx}$ and the identifier of the data strip $SU_{Nx}$, where the status of the mapping between the host access address of the data of the data strip $SU_{Nx}$ and the identifier of the data strip $SU_{Nx}$ is the readable state. In this case, the client may directly read data in a storage address for storing the data strip $SU_{Nx}$ as the data of the data strip $SU_{Nx}$. In response to the write completion response sent by the client to the host, the client sends the commit command to the data storage node $N_x$ the data storage node $N_x$ sets the status of the mapping between the host access address of the data of the data strip $SU_{Nx}$ and the identifier of the data strip $SU_{Nx}$ to the readable state, and the data storage node $N_x$ no longer returns a response to the client, thereby reducing interactions between the client and the storage node. The client sends the commit command to the data storage node $N_x$ so that the client does not need to perform a check operation according to the EC algorithm when reading the data of the data strip $SU_{Nx}$ from the storage node $N_x$ further improving read performance of the distributed storage system.

In this embodiment of the present disclosure, the status of the mapping between the host access address of the data of the data strip $SU_{Nx}$ and the identifier of the data strip $SU_{Nx}$ may be represented by using an identifier. The identifier may be a number, a letter, a combination of a number and a letter, or another representation form.

In this embodiment of the present disclosure, in addition to the stripe including the data strip and the check strip, there may be a stripe including a plurality of replica strips. All strips $SU_{ij}$ in the stripe including a plurality of replica strips are data strips, and data of the strips $SU_{ij}$ is the same.

In another implementation of this embodiment of the present disclosure, to store the data of the strip $SU_{nx}$, the client may first send the data of the strip $SU_{nx}$ to a primary storage node, and then the primary storage node sends data of a strip that is to be stored in another storage node, to the corresponding storage node.

This embodiment of the present disclosure is also applicable to a distributed storage system in which a stripe is not managed based on a partition.

In this embodiment of the present disclosure, a plurality of clients may access data of a same strip that is stored in a same storage node, for example, data of a data strip. Alternatively, a same LUN may be mounted to a plurality of hosts, and the plurality of hosts access data of a same data strip that is stored in a same storage node.

Identifiers used to describe the stripe, the data strip, the check strip, and the storage node in this embodiment of the present disclosure are merely intended to describe this embodiment of the present disclosure more clearly, and a similar identifier is not required in actual product implementation. Therefore, the identifiers used to describe the stripe, the data strip, the check strip, and the storage node in this embodiment of the present disclosure are not intended to limit the present disclosure.

Correspondingly, the embodiments of the present disclosure further provide a computer readable storage medium and a computer program product. The computer readable storage medium and the computer program product include computer instructions that are used to implement various solutions described in the embodiments of the present disclosure.

Correspondingly, the embodiments of the present disclosure further provide a client and a storage node, configured to perform corresponding operations in the embodiments of the present disclosure.

In the embodiments of the present disclosure, M storage nodes $N_j$ are not intended to strictly limit identifiers of the storage nodes, but are used to indicate the M storage nodes, where j is an integer ranging from 1 to M. Similarly, in the embodiments of the present disclosure, M strips $SU_{Nj}$ in a stripe are not intended to strictly limit identifiers of the strips either, but are used to indicate the M strips in the stripe.

The embodiments of the present disclosure may alternatively be applied to a storage array. The storage array includes a controller and a hard disk. Correspondingly, functions of the client and the stripe server in the distributed storage system in the embodiments of the present disclosure may be implemented by the controller in the storage array, and establishment and status maintenance of the mapping between the host access address of the data of the data strip $SU_{Nx}$ and the identifier of the data strip $SU_{Nx}$ may be implemented by the controller in the storage array. That the client sends the data of the strip to the storage node may be implemented by the controller in the storage array by sending data to the hard disk. That the storage node $N_x$ receives the write success response returned by the hard disk that provides the storage address, and the storage node $N_x$ returns the write success response to the client may also be implemented by the controller in the storage array.

In the several embodiments provided in the present disclosure, it should be understood that the disclosed apparatus and method may be implemented in other manners. For example, the unit division in the described apparatus embodiment is merely logical function division, and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or the communication connections between the apparatuses or units may be implemented in electronic, mechanical, or other forms.

The units described as separate parts may or may not be physically separate, and parts displayed as units may or may not be physical units, that is, may be located in one position, or may be distributed in a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

What is claimed is:

1. A distributed storage system, comprising:
M storage nodes comprising L data storage nodes, wherein both L and M are positive integers, and wherein L is less than M; and
a client coupled to the M storage nodes and configured to:
receive, from a host, a write request comprising first data of the host and a first host access address of the first data;
generate second data of M strips for the first data in response to the write request and according to an erasure coding (EC) algorithm, wherein the M strips constitute a stripe, and wherein the M strips comprise: L data strips and (M-L) check strips, wherein the L data strips comprise third data of a first data strip of the L data strips, and wherein the third data based on dividing the first data, and wherein the (M-L) check strips store check data of the first data; and
send the second data to the M storage nodes,
wherein a first data storage node of the M storage nodes is configured to:
receive, from the client, the third data;
establish a first mapping between a second host access address of the third data and a first identifier of the first data strip;
write the third data into a hard disk of the first data storage node;
receive, from the hard disk, a first write success response; and
send, in response to receiving the first write success response, a second write success response to the client,
wherein the client is further configured to:
transmit, in response to receiving the second write success response, a write completion response to the host;
receive, from the host, a first read request comprising the second host access address; and
send, to the first data storage node, a first request for reading the third data, and
wherein the first data storage node is further configured to:
detect, in response to the first request, that a status of the first mapping is a write completion state; and
send, to a stripe server, a check request comprising a third identifier.

2. The distributed storage system of claim 1, wherein the first data storage node is further configured to set, in response to receiving the first write success response, the status of the first mapping to the write completion state.

3. The distributed storage system of claim 2, wherein the stripe server is coupled to the client and the M storage nodes and is configured to:
record a second mapping between the stripe and second identifiers of the M strips; and
record a third mapping between a fourth identifier of a first strip in the stripe and a first storage node,
wherein the stripe server is configured to:
receive the check request;
determine the stripe based on the fourth identifier;
read fourth data of the first strip based on the third mapping; and
send a notification to the first data storage node when the fourth data is accurate,
wherein the notification indicates that the third data is accurate;
wherein the first data storage node is further configured to transmit, in response to receiving the notification, the third data to the client, and
wherein the client is further configured to:
receive the third data; and
transmit the third data to the host.

4. The distributed storage system of claim 1, wherein the client is further configured to send, in response to receiving the second write success response, a commit command to the first data storage node, and wherein the first data storage node is further configured to:
receive the commit command from the client; and
set the status of the first mapping to a readable state.

5. The distributed storage system of claim 1, wherein the client is further configured to:
receive, from the host, a second read request comprising the second host access address; and
send, to the first data storage node, a second request for reading the third data,
wherein the first data storage node is further configured to:
detect, in response to receiving the second request, that the status of the first mapping is a readable state; and
transmit the third data to the client, and
wherein the client is further configured to:
receive the third data from the first data storage node; and
transmit, to the host, the third data.

6. The distributed storage system of claim 1, wherein the client is further configured to obtain the stripe from a plurality of stripes.

7. A computer program product comprising computer-executable instructions stored on a non-transitory computer-readable storage medium that, when executed by a processor, cause a distributed storage system to:
receive a write request comprising first data of a host and a first host access address of the first data;
generate second data of M strips for the first data according to an erasure coding (EC) algorithm, wherein the M strips constitute a stripe, and wherein the M strips comprise:
L data strips, wherein the L data strips comprise third data of a first data strip of the L data strips, and wherein the third data is obtained by dividing the first data; and
(M-L) check strips storing check data of the first data; and
send the second data to M storage nodes of the distributed storage system, wherein the M storage nodes comprise L data storage nodes, wherein both L and M are positive integers, and wherein L is less than M, wherein the computer-executable instructions further cause a first data storage node of the M storage nodes to:
receive the third data;
establish a first mapping between a second host access address of the third data and a first identifier of the first data strip;
write the third data into a hard disk of the first data storage node;
receive a first write success response; and
send, in response to receiving the first write success response, a second write success response to a client,
wherein the computer-executable instructions further cause the client to:
transmit a write completion response to the host;
receive, from the host, a first read request comprising the second host access address; and
send, to the first data storage node, a first request for reading the third data, and
wherein the computer-executable instructions further cause the first data storage node to:
detect, in response to receiving the first request, that a status of the first mapping is a write completion state; and
send, to a stripe server, a check request comprising a third identifier.

8. The computer program product of claim 7, wherein the computer-executable instructions further cause the first data storage node to set, in response to receiving the first write success response, the status of the first mapping to the write completion state.

9. The computer program product of claim 8, wherein the computer-executable instructions further cause the stripe server of the distributed storage system to:
record a second mapping between the stripe and second identifiers of the M strips; and
record a third mapping between a fourth identifier of a first strip in the stripe and a first storage node,
wherein the computer-executable instructions further cause the stripe server to:
receive the check request;
determine the stripe based on the fourth identifier;
read fourth data of the first strip based on the third mapping;
determine, according to the EC algorithm, whether the fourth data is accurate;
and send a notification to the first data storage node when the fourth data is accurate,
wherein the notification indicates that the third data is accurate,
wherein the computer-executable instructions further cause the first data storage node to transmit, in response to receiving the notification, the third data to the client, and
wherein the computer-executable instructions further cause the client to:
receive the third data; and
transmit the third data to the host.

10. The computer program product of claim 7, wherein the computer-executable instructions further cause the client to send, in response to receiving the second write success response, a commit command to the first data storage node.

11. The computer program product of claim 10, wherein the computer-executable instructions further cause the first data storage node to:
receive the commit command from the client; and
set the status of the first mapping to a readable state.

12. The computer program product of claim 7, wherein the computer-executable instructions further cause the client to:
receive, from the host, a second read request comprising the second host access address; and
send, to the first data storage node, a second request for reading the third data.

13. The computer program product of claim 12, wherein the computer-executable instructions further cause the first data storage node to:
detect, in response to receiving the second request, that the status of the first mapping is a readable state; and
transmit the third data to the client.

14. The computer program product of claim 13, wherein the computer-executable instructions further cause the client to:
receive the third data from the first data storage node; and
transmit, to the host, the third data.

15. The computer program product of claim 7, wherein the computer-executable instructions further cause the client to obtain the stripe from a plurality of stripes.

16. A client in a distributed storage system comprising:
a memory configured to store instructions; and
a processor coupled to the memory, wherein the instructions cause the processor to be configured to:
receive, from a host, a write request comprising first data of the host and a first host access address of the first data;
generate second data of M strips for the first data according to an erasure coding (EC) algorithm, wherein the M strips constitute a stripe, and wherein the M strips comprise:
L data strips, wherein the L data strips comprise third data of a first data strip of the L data strips, and wherein the third data is obtained by dividing the first data; and
(M-L) check strips storing check data of the first data;
send the second data to M storage nodes of the distributed storage system to enable a first data storage node of the M storage nodes to:
receive, from the client, the third data;
establish a first mapping between a second host access address of the third data and a first identifier of the first data strip;
write the third data into a hard disk of the first data storage node; and
receive, from the hard disk, a first write success response; and
receive, in response to the first write success response, a second write success response;
transmit, in response to receiving the second write success response, a write completion response to the host;
receive, from the host, a first read request comprising the second host access address; and
send, to the first data storage node, a first request for reading the third data, wherein the first data storage node is further enabled to:
detect, in response to receiving the first request, that a status of the first mapping is a write completion state; and
send, to a stripe server, a check request comprising a third identifier.

17. The client of claim 16, wherein the instructions further cause the processor to be configured to obtain the stripe from a plurality of stripes.

18. The client of claim 16, wherein the instructions further cause the processor to be configured to:
   receive, from the first data storage node, the third data; and
   transmit the third data to the host.

19. The client of claim 16, wherein the instructions further cause the processor to be configured to send, in response to receiving the second write success response, a commit command to the first data storage node.

20. The client of claim 16, wherein the client is coupled to the stripe server.

* * * * *